US009079722B2

(12) United States Patent
de Hertogh (10) Patent No.: US 9,079,722 B2
(45) Date of Patent: Jul. 14, 2015

(54) GROUPER APPARATUS FOR A PACKAGING MACHINE AND METHODS OF GROUPING ITEMS FOR PACKAGING

(71) Applicant: Holland Engineering, LLC, New Britain, CT (US)

(72) Inventor: Peter de Hertogh, West Hartford, CT (US)

(73) Assignee: Holland Engineering, LLC, New Britain, CT (US)

( * ) Notice: Subject to any disclaimer, the term of this patent is extended or adjusted under 35 U.S.C. 154(b) by 0 days.

(21) Appl. No.: 14/136,526

(22) Filed: Dec. 20, 2013

(65) Prior Publication Data

US 2014/0190126 A1 Jul. 10, 2014

Related U.S. Application Data

(60) Provisional application No. 61/750,115, filed on Jan. 8, 2013.

(51) Int. Cl.
| | |
|---|---|
| *B65G 47/26* | (2006.01) |
| *B65G 47/08* | (2006.01) |
| *B65G 33/02* | (2006.01) |
| *B65G 33/06* | (2006.01) |
| *B65G 47/71* | (2006.01) |
| *B65B 35/46* | (2006.01) |

(52) U.S. Cl.
CPC .............. *B65G 47/088* (2013.01); *B65G 33/02* (2013.01); *B65G 33/06* (2013.01); *B65G 47/71* (2013.01); *B65B 35/46* (2013.01)

(58) Field of Classification Search
CPC .............................. B65G 47/088; B65G 33/06
USPC ........... 198/418.7, 418.8, 419.1, 419.2, 419.3
See application file for complete search history.

(56) References Cited

U.S. PATENT DOCUMENTS

| | | | | | |
|---|---|---|---|---|---|
| 3,545,165 | A | * | 12/1970 | Greenwell | 53/398 |
| 3,572,004 | A | * | 3/1971 | Carmichael | 53/48.2 |
| 3,827,211 | A | * | 8/1974 | Zavatone et al. | 53/48.7 |

(Continued)

FOREIGN PATENT DOCUMENTS

EP 1 723 035 10/2012

OTHER PUBLICATIONS

Kinsley Incorporated, Timing Screws, [retrieved on Mar. 4, 2014], 1 page, <URL:http://kinsleyinc.com/publicpages/timingscrews.aspx>.

(Continued)

*Primary Examiner* — William R Harp
(74) *Attorney, Agent, or Firm* — Lipsitz & McAllister, LLC (57) ABSTRACT

A grouper apparatus for a packaging machine and methods of grouping items for packaging are provided. The grouper apparatus may have at least two container guides for defining lanes for receiving containers, at least one of the at least two container guides being movable, and at least one timing screw. The at least one timing screw may be positioned at least one of: between the at least two container guides; and coaxial with a corresponding one of the at least two container guides. The at least one timing screw may be adapted to receive and advance at least one lane of containers on either side thereof. A controller may be provided for controlling revolution of the at least one timing screw to provide at least one of a desired output grouping and a desired output rate of the containers.

20 Claims, 9 Drawing Sheets

(56) References Cited

U.S. PATENT DOCUMENTS

| | | | |
|---|---|---|---|
| 3,908,332 A * | 9/1975 | Ebbinghaus et al. | 53/48.7 |
| 4,429,512 A * | 2/1984 | Pegon, Jr. | 53/534 |
| 4,693,055 A * | 9/1987 | Olsen et al. | 53/443 |
| 5,737,898 A * | 4/1998 | Grimm et al. | 53/48.1 |
| 6,308,817 B1 * | 10/2001 | Corniani et al. | 198/419.3 |
| 7,392,905 B2 | 7/2008 | Anderson et al. | |
| 7,552,570 B2 | 6/2009 | Raudat et al. | |
| 8,033,082 B2 | 10/2011 | Raudat et al. | |
| 2005/0229539 A1 | 10/2005 | Raudat et al. | |
| 2009/0223177 A1 | 9/2009 | Raudat et al. | |
| 2009/0229227 A1 | 9/2009 | Raudat et al. | |

OTHER PUBLICATIONS

CSS International Corporation, Timing Screws, [retrieved on Mar. 4, 2014], 2 pages, <URL: http://www.cssintl.com/TimingScrews/TimingScrews.aspx>.

CSS International Corporation, Timing Screws Brochure, [retrieved on Mar. 4, 2014], 2 pages, <URL: http://cssintl.com/PDF/timing_screws.pdf>.

Ernst Timing Screw Co., Timing Screws, [retrieved on Mar. 4, 2014], 6 pages, <URL: http://www.ernsttiming.com/timing.htm#combining>.

Morrison Container Handling Solutions, Timing Screws, [retrieved on Mar. 4, 2014], 2 pages, <URL: http://morrison-chs.com/TimingScrew.html>.

Carleton Helical Technologies, Feedscrews, [retrieved on Mar. 4, 2014], 2 pages, <URL: http://carletonhelical.com/what-we-do/feedscrews/>.

ARPAC, Item # Brandpack BPMP-5400 Continuous Motion Bottom Overlap Shrink Wrapping System, [retrieved on Mar. 4, 2014], 3 pages, <URL: http://products.arpac.com/item/packaging-machinery/tray-shrink-wrappers/ous-motion-bottom-overlap-shrink-wrappin-12?&plpver=1001&assetid=g1021>.

Neway Packaging Corp., TrayStar TS-2000 Series Continuous-Motion Wrap-Around Tray Loaders, [retrieved on Mar. 4, 2014], 2 pages, <URL: http://www.mikevision.com/web/web_pages/newaypkg/equipment/shrink/arpac/traystar_ts2000.htm>.

Staban Engineering Corp., Model T01 Tray Packer Brochure, [retrieved on Mar. 4, 2014], 2 pages, <URL: http://www.staban.com/wp-content/themes/staban/pdfs/T01-Brochure-Tech-Sheet.pdf>.

* cited by examiner

GROUPER APPARATUS FOR A PACKAGING MACHINE AND METHODS OF GROUPING ITEMS FOR PACKAGING

This application claims the benefit of commonly owned U.S. provisional application No. 61/750,115, filed on Jan. 8, 2013, which is incorporated herein and made a part hereof by reference.

BACKGROUND OF THE INVENTION

The present invention relates to the field of automated container packaging. More specifically, the present invention relates to a grouper apparatus for a packaging machine, and methods of grouping items for packaging.

Packaging machinery typically incorporates a method to collate and separate ("group") containers into a desired pack pattern in preparation for packaging. The section of the machine that collates and separates the containers is called a "Grouper." Different methods have been developed to take a mass flow of containers entering a packaging machine's in-feed conveyor and to group these containers in a controlled manner to be metered into the packing or wrapping section of the machine. After grouping, the now collated containers may move through the machine, and the containers may be enveloped or unitized in corrugated cardboard or thin poly film, or other suitable material, and then discharged from the machine for future use, such as to be warehoused or shipped.

In many instances the most challenging aspect of designing packaging machines may be in developing a dependable grouping mechanism(s). This task may be further complicated by a number of factors. For example, unstable containers that can easily fall over or lose proper orientation; the many sizes and pack patterns that are required to run on a single machine; the difficulty in controlling non-round containers; the high amount of containers that must be "packed" per minute; customer demands of rapid "change-over" from one size container to the next; and cost constraints, as well as other factors.

Several technologies currently exist to group containers. For example, servo or mechanical side mounted groupers; side mounted "star wheels"; bottom pin groupers; overhead brake mounted groupers at the loading station; overhead shifting pin groupers (also known as shuttle groupers); right angle side push transfer groupers; and pick and place groupers. Each of these has several disadvantages, including but not limited to speed limitations, limitations in the number of lanes of containers that can be controlled and the output, the difficulty in changing over from one container size to another, the difficulty in changing from one pack pattern to another (e.g., changing from a six-pack or twelve-pack grouping to an eight-pack or 24-pack grouping), high costs, complicated design, low reliability, excessive floor space, higher machine elevations, ease of repair, ease of maintenance, downtime, cost of repair, maintenance personnel skill required, obsolescense, and the like.

Accordingly, it would be advantageous to provide a grouper apparatus and methods of grouping items for packaging that may increase production speeds, is affordable, may be integrated into a wide range of existing packaging machinery designs, simplifies change over and reduces change-over time.

The apparatus and methods of the present invention provide the foregoing and other advantages.

SUMMARY OF THE INVENTION

The present invention relates to a grouper apparatus for a packaging machine, and methods of grouping items for packaging.

In one example embodiment of a grouper apparatus for a packaging machine, the grouper apparatus comprises at least two container guides for defining lanes for receiving containers, at least one of the at least two container guides being movable, and at least one timing screw positioned at least one of: between the at least two container guides; and coaxial with a corresponding one of the at least two container guides. The at least one timing screw may be adapted to receive and advance at least one lane of containers on either side thereof.

The grouper apparatus may further comprise a controller for controlling revolution of the at least one timing screw to provide at least one of a desired output grouping and a desired output rate of the containers.

Pockets for capturing and advancing one or more of the containers are formed between threads of the at least one timing screw. The at least one timing screw may be adapted to accept a wide variety of container shapes and sizes, including but not limited to round containers, square containers, rectangular containers, oval containers, tapered containers, asymmetric containers, and the like.

The grouper apparatus may also comprise a conveyor for moving the containers through the grouper. At least one of a desired output grouping and a desired output rate may be provided by controlling the revolution of the at least one timing screw while maintaining conveyor movement. The conveyor may comprise an in-feed conveyor for feeding the containers into the lanes defined by the at least two container guides and a grouper conveyor for moving the containers through the lanes. The at least one of the desired output grouping and the desired output rate are provided by controlling the revolution of the at least one timing screw while maintaining movement of the grouper conveyor.

One or more intake guides may be provided for guiding the containers from the in-feed conveyor to an in-feed portion of the at least one timing screw.

The in-feed conveyor may comprise a moveable conveyor which is adapted to sweep across an area adjacent the in-feed portion of the at least one timing screw to direct the containers into each of the lanes in turn.

The at least one timing screw may be releasably held in the grouper apparatus. For example, the at least one timing screw may be held in the grouper apparatus with a releasable snap-fit connection or the like.

The at least one of the at least two container guides and the at least one timing screw are each laterally movable for at least one of: defining lanes of varying sizes for accommodating containers of various sizes or shapes; defining one or more lanes between the at least two container guides and the at least one timing screw; and adding or removing one or more lanes.

By moving the at least one of the at least two container guides or the at least one timing screw, one of: one lane is formed on each side of the at least one timing screw; two lanes are formed on at least one side of the at least one timing screw; and a lane is removed from at least one side of the at least one timing screw.

The at least one timing screw may be provided with a gap at defined intervals of the screw threads. The defined intervals may be adapted to provide a desired output grouping without the need to stop revolution of the timing screw.

In one example embodiment, the at least two container guides may comprise two container guides. The at least one timing screw may comprise a single timing screw positioned between the two container guides. The two container guides are positioned such that two lanes are provided on at least one side of the single timing screw, an inside lane adjacent the single timing screw and an outside lane adjacent the inside lane. The containers received in the outside lane are offset from the containers received in the inside lane. In such an example embodiment, the single timing screw can be controlled to output container groupings having multiples of three containers (e.g., if two lanes are provided on one side of the timing screw and one lane is provided on the other side) or multiples of four containers (e.g., if two lanes are provided on both sides of the timing screw).

In a further example embodiment, the at least two container guides are positioned to provide two lanes on each side of the at least one timing screw, an inside lane adjacent each side of the at least one timing screw and a corresponding outside lane adjacent each of the inside lanes. The containers received in each of the outside lanes are offset from the containers received in each of the corresponding inside lanes such that output of one of the containers in the inside lane from the timing screw also outputs a corresponding offset container in the outside lane.

In another example embodiment of the present invention, the at least one timing screw may comprise two timing screws, each of the two timing screws being arranged coaxial with a corresponding one of the at least two container guides. Three lanes are formed between the two timing screws, an inside lane adjacent each of the two timing screws and a center lane between the two inside lanes, the containers in the center lane being offset from the containers in the two inside lanes.

In a further example embodiment, the at least one timing screw may comprise a first timing screw arranged coaxial with a first outer one of the at least two container guides and a second timing screw arranged between a second outer one of the at least two container guides and an inner container guide, the inner container guide being arranged between the first and the second timing screw. Two lanes are formed between the first timing screw and the inner container guide, the containers in each of the two lanes being offset from one another. Two lanes are formed between the second timing screw and the inner container guide, the containers in each of the two lanes being offset from one another. Two lanes are formed between the second timing screw and the second outer container guide, the containers in each of the two lanes being offset from one another.

In an additional example embodiment, the at least two container guides may comprise three container guides, a first outer container guide, an inner container guide, and a second outer container guide. The at least one timing screw may comprise two timing screws: a first timing screw arranged between the first outer container guide and the inner container guide, with two lanes being formed on either side of the first timing screw; and a second timing screw arranged between the second outer container guide and the inner container guide, with two lanes being formed on either side of the second timing screw. The containers in each of the two lanes formed on either side of each of the two timing screws are offset from one another.

The present invention also encompasses methods of grouping containers for a packaging machine. An example embodiment of such a method comprises providing at least two container guides for defining lanes for receiving containers, at least one of the at least two container guides being movable, and providing at least one timing screw positioned at least one of: between the at least two container guides; and coaxial with a corresponding one of the at least two container guides. Each of the at least one timing screw is adapted to receive and advance at least one lane of the containers on either side thereof.

The method may further comprise controlling revolution of the at least one timing screw to provide at least one of a desired output grouping and a desired output rate of the containers.

The method may also include additional features discussed above in connection with the various embodiments of the corresponding grouper apparatus.

BRIEF DESCRIPTION OF THE DRAWINGS

The present invention will hereinafter be described in conjunction with the appended drawing figures, wherein like reference numerals denote like elements, and.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

The present invention relates to the field of automated container packaging. More specifically, the present invention relates to a grouper apparatus for a packaging machine, and methods of grouping items for packaging.

The terms "packaging machine" and "packing machine," as used interchangeably herein, should be understood to mean, for example, tray packing machines, case packing machines, shrink wrapping machines, combination tray packing and shrink wrapping machines, cartoning machines, case loading and unloading machines, drop packers, and other suitable packing machines.

Figure 1:
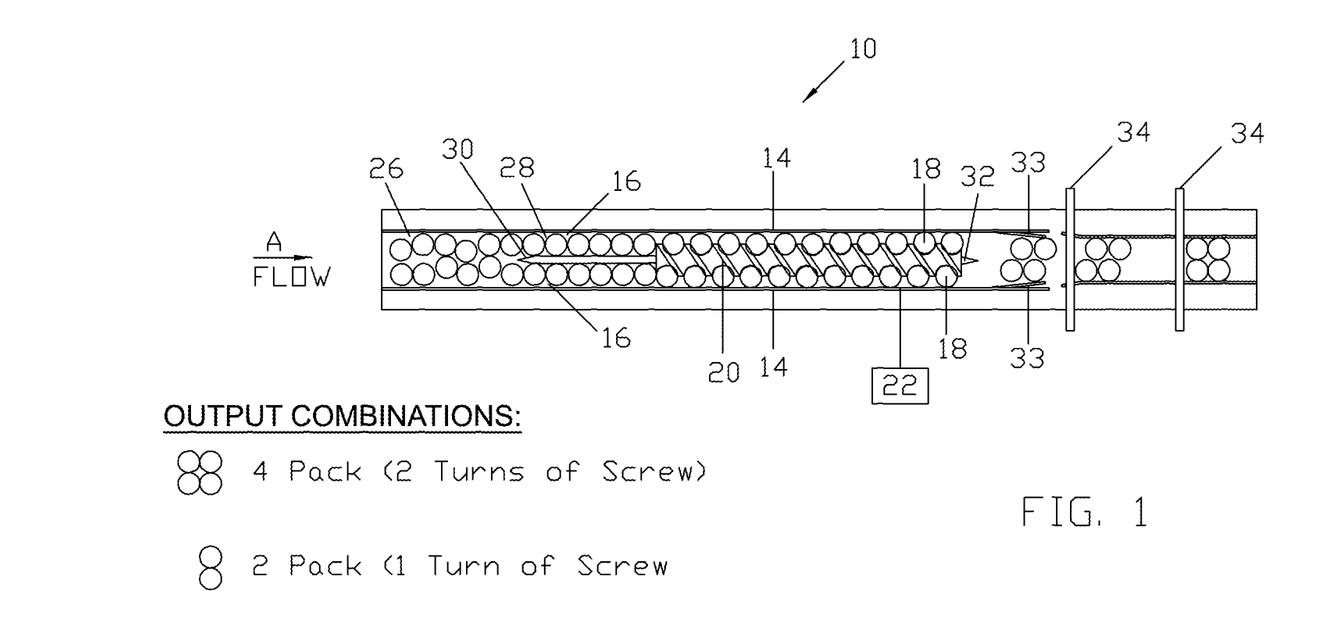
FIG. 1 shows an example embodiment of a grouper used with round containers in accordance with the present invention.

One example embodiment of a grouper apparatus for a packaging machine in accordance with the present invention is shown in FIG. 1. A grouper apparatus 10 (also referred to herein as "a grouper") for a packaging machine (not shown) may comprise at least two container guides 14 for defining lanes 16 for receiving containers 18. At least one of the container guides 14 may be movable. The grouper 10 may also comprise at least one timing screw 20. The at least one timing screw may be positioned between the at least two container guides 14 (as shown for example in FIG. 1) and/or be positioned coaxial with a corresponding one of the at least two container guides 14 (as shown for example in FIG. 5 discussed below). Each of the at least one timing screw 20 may be adapted to receive and advance at least one lane 16 of containers 18 on either side thereof.

The grouper 10 may further comprise a controller 22 for controlling revolution of the at least one timing screw 20 to provide at least one of a desired output grouping and a desired output rate of the containers 18.

While the example embodiment of FIG. 1 is shown with round containers 18, the present invention may be adapted for use with containers of different shapes and sizes. For example, the at least one timing screw 20 may be adapted to accept one of round containers, square containers, rectangular containers, oval containers, tapered containers, asymmetric containers, or the like. An embodiment for use with non-round containers is described in more detail below in connection with FIG. 7.

Figure 1A:
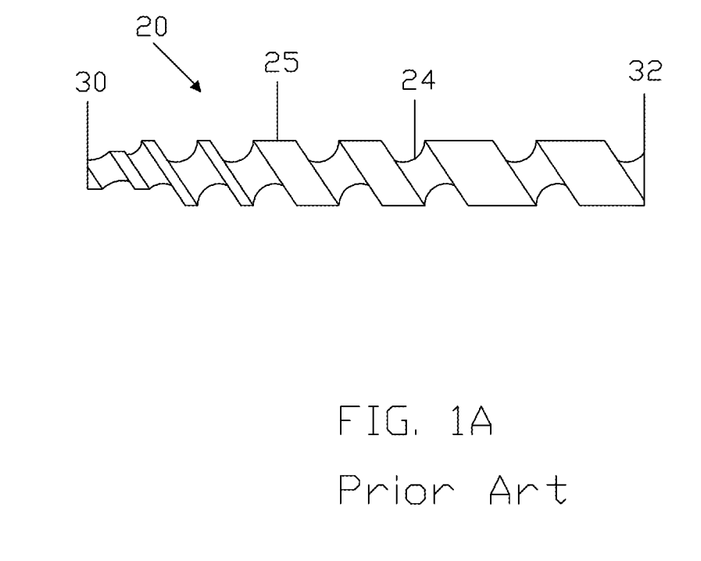
FIG. 1A shows an example of a prior art timing screw which may be used with the present invention.

The timing screw 20, an example of which is shown in more detail in FIG. 1A, may have a helically threaded shaft, the threads 25 of which define a "pocket" 24 therebetween to capture and advance the containers 18, to control the metering out of the leading container 18 from each lane of containers 18, and prevent the unintentional release thereof. As used herein, the leading container 18 is the next container 18 to be released by the grouper 10 from each lane 16. While FIG. 1A shows a prior art timing screw, it should be appreciated that specially designed timing screws can be developed for use with the present invention that are adapted to the container size and shape, and/or that can accommodate more than one container in the pocket 24.

In operation, the containers 18 may be moved into and through the grouper 10 by a conveyor. The conveyor may comprise an in-feed conveyor 26 and a grouper conveyor 28. At least one of the desired output grouping and the desired output rate are provided by controlling the revolution of the at least one timing screw while maintaining movement of the conveyor.

The in-feed conveyor 26 feeds the containers into the lanes 16 defined by the at least two container guides. The containers 18 move from the in-feed conveyor 26 to the grouper conveyor 28, which moves the containers through the grouper 10 in the direction of arrow A. Those skilled in the art should appreciate that the in-feed conveyor 26 and the grouper conveyor 28 may be sections of a continuous conveyor belt running through the packaging machine. As the mass flow of containers 18 are conveyed from the in-feed conveyor 26 to the grouper 10, the container guides 14 may receive the containers 18. The container guides 14 may be used to direct the containers 18 into the lanes 16 defined by the at least two container guides 14 and the at least one timing screw 20. For example, the containers 18 shown in FIG. 1 are separated into two lanes 16, one on each side of the timing screw 20. When the containers 18 reach an in-feed portion 30 of the timing screw 20, they engage with the pocket 24 of the timing screw 20 and are conveyed toward a discharge portion 32 of the timing screw 20 by the threads 25 of the timing screw 20 as it rotates. A tip of the infeed portion 30 of the timing screw 20 may be tapered to assist in guiding the containers 18.

The controller 22 may control the timing screw 20 such that a particular number of containers 18 are moved through the grouper 10 in a given amount of time and at defined intervals. In particular, the controller 22 may control the starting, stopping, and speed of revolution of the timing screw 20 such that desired quantity groupings of containers 18 are discharged from the timing screw 20 at defined intervals. For example, with the two lanes 16 of containers 18 shown in FIG. 1, when a pair of containers (a container 18 on each side of the timing screw 20) is at the discharge portion 32 of the timing screw 20, one turn of the timing screw 20 may release both containers 18 from the timing screw 20. Similarly, two turns of the timing screw 20 may release four containers 18. The revolution of the timing screw 20 may then be stopped for a defined interval, and then rotated again to release the desired grouping. The process is repeated to obtain separate groupings of containers 18 for subsequent packaging. It should be appreciated that the conveyors 26, 28, or at least the grouper conveyor 28, may be continuously moving during the process of starting and stopping the revolution of the timing screw such that containers that have already been released can continue to be conveyed through or into the packaging machine. The discharge portion 32 of the timing screw 20 may also be tapered.

Note that for ease of explanation, the timing screw 20 is described herein as metering one container 18 from each lane 16 for each revolution of the timing screw 20. However, it should be appreciated that, depending on the lead of the thread 25 of the timing screw 20, a container 18 may be output at less than one full revolution of the timing screw 20 or it may take more than one revolution to output a container 18.

With the present invention, the quantity of containers 18 released from the grouper 10 and/or the interval at which the groupings are output, may be changed easily, via a user interface of the controller 22. For example, the controller may have pre-programmed groupings and/or output rates that can be selected via the user interface or by manually entering a specific group quantity and/or output rate into the controller 22 via the user interface.

The timing screw(s) 20 may be controlled using either A/C motors, servo motors, or any other suitable motors pursuant to the grouping application.

After the desired quantity grouping of containers 18 is discharged from the timing screw 20, this grouping of containers 18 may be further conveyed along the packaging machine for additional operations. For example, after grouping, the now grouped containers 18 may be packaged, enveloped or unitized in corrugated cardboard or thin poly film and then discharged to be warehoused or shipped. In some embodiments, the grouping of containers 18 may pass at least one flight bar 34, which, as is known in the art, moves with the conveyor to advance and align the containers 18 within the group and/or separate the groupings of containers 18 for subsequent packaging. Movable discharge guides 33 may be provided to assist in grouping and guiding the discharged containers 18 prior to reaching the flight bar(s) 34.

Figure 2:
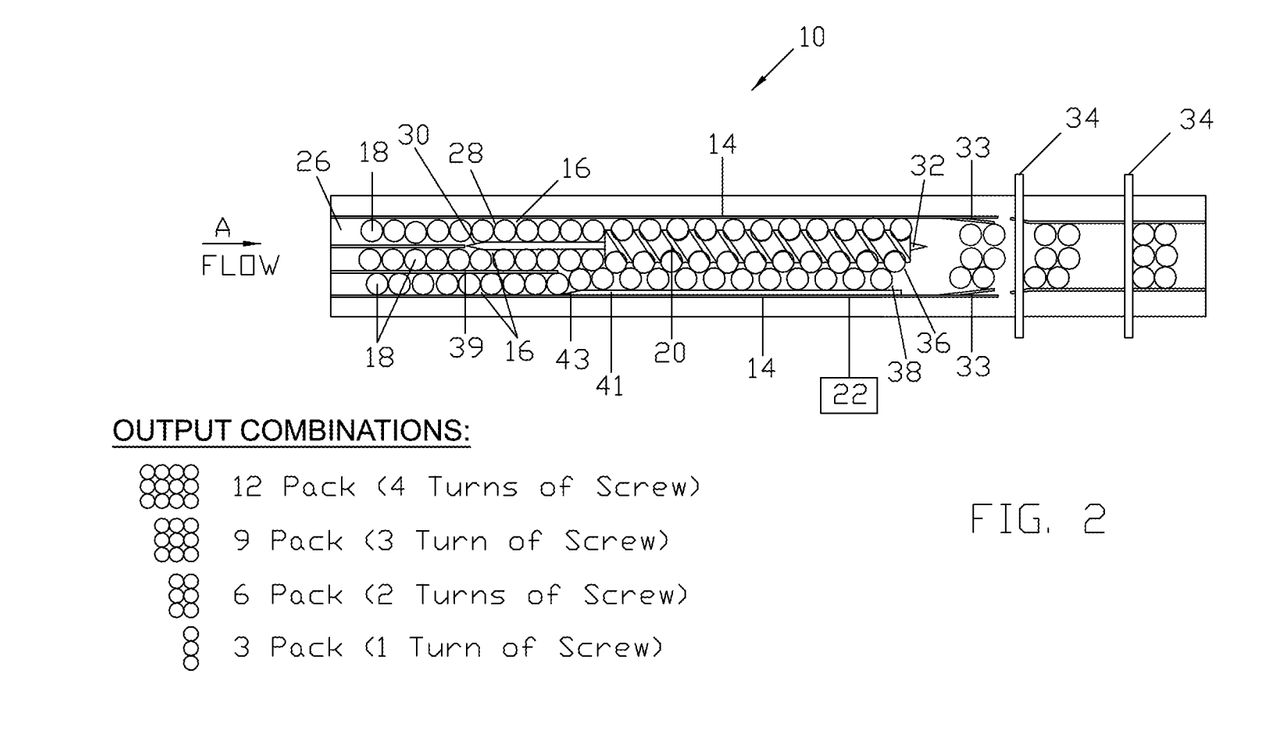
FIG. 2 shows a second example embodiment of a grouper in accordance with the present invention.

Another example embodiment of a grouper apparatus 10 in accordance with the present invention is shown in FIG. 2. The grouper 10 shown in FIG. 2 is similar to the FIG. 1 embodiment in that it comprises two container guides 14 and a single timing screw 20 positioned between the two container guides 14. However, in the FIG. 2 example embodiment, the two container guides 14 are positioned such that two lanes 16 are provided on one side of the single timing screw 20, an inside lane 36 adjacent the single timing screw 20 and an outside lane 38 adjacent the inside lane 36. The container guide 14 that provides the two lanes 36, 38 may be spaced from the timing screw 20 so that two containers 18 cannot fit side by side. For example, the container guide 14 may be spaced from the timing screw 20 such that two lanes 16 of containers 18 can pass between the container guide 14 and the timing screw 20 only if the containers 18 received in the outside lane 38 are offset from, and in contact with, the containers 18 received in the inside lane 36. For example, the offset may be by half of the container diameter, or any other suitable offset.

Alternatively, or in addition, as shown in FIG. 2, a collating guide 41 may also be provided so that two containers 18 cannot fit side by side between a container guide 14 and a timing screw 20. The collating guide 41 may have a tapered leading edge 43 for guiding the containers 18 into the offset position. The collating guide 41 may be co-extensive with, or slightly longer than, the timing screw 20.

As the timing screw 20 rotates to move the containers 18 in the inside lane 36 adjacent the timing screw 20, the containers 18 in the outside lane 38 are allowed to move along the grouper conveyor 28. When the timing screw 20 is stopped, the offset containers 18 in the outside lane 38 are prevented from moving along the grouper conveyor 28 by corresponding containers 18 in the inside lane 36 still held in the pocket 24. Any offset containers 18 in the outside lane 38 that are not held back by a corresponding container 18 in the inside lane 36 are released. In this manner, the single timing screw 20 may be controlled by the controller 22 to output container groupings having multiples of three containers 18. For example, one turn of the timing screw 20 may release a 3-container group; two turns of the timing screw 20 may release a 6-container group; three turns of the timing screw 20 may release a 9-container group; 4 turns of the timing screw 20 may release a 12-container group; etc.

Optionally, the grouper 10 may include one or more intake guides 39 to further order the containers 18 and establish the lanes 16, 36, 38. The intake guide 39 may guide the containers 18 from the in-feed conveyor 26 to the in-feed portion 30 of the timing screw 20.

Figure 3:
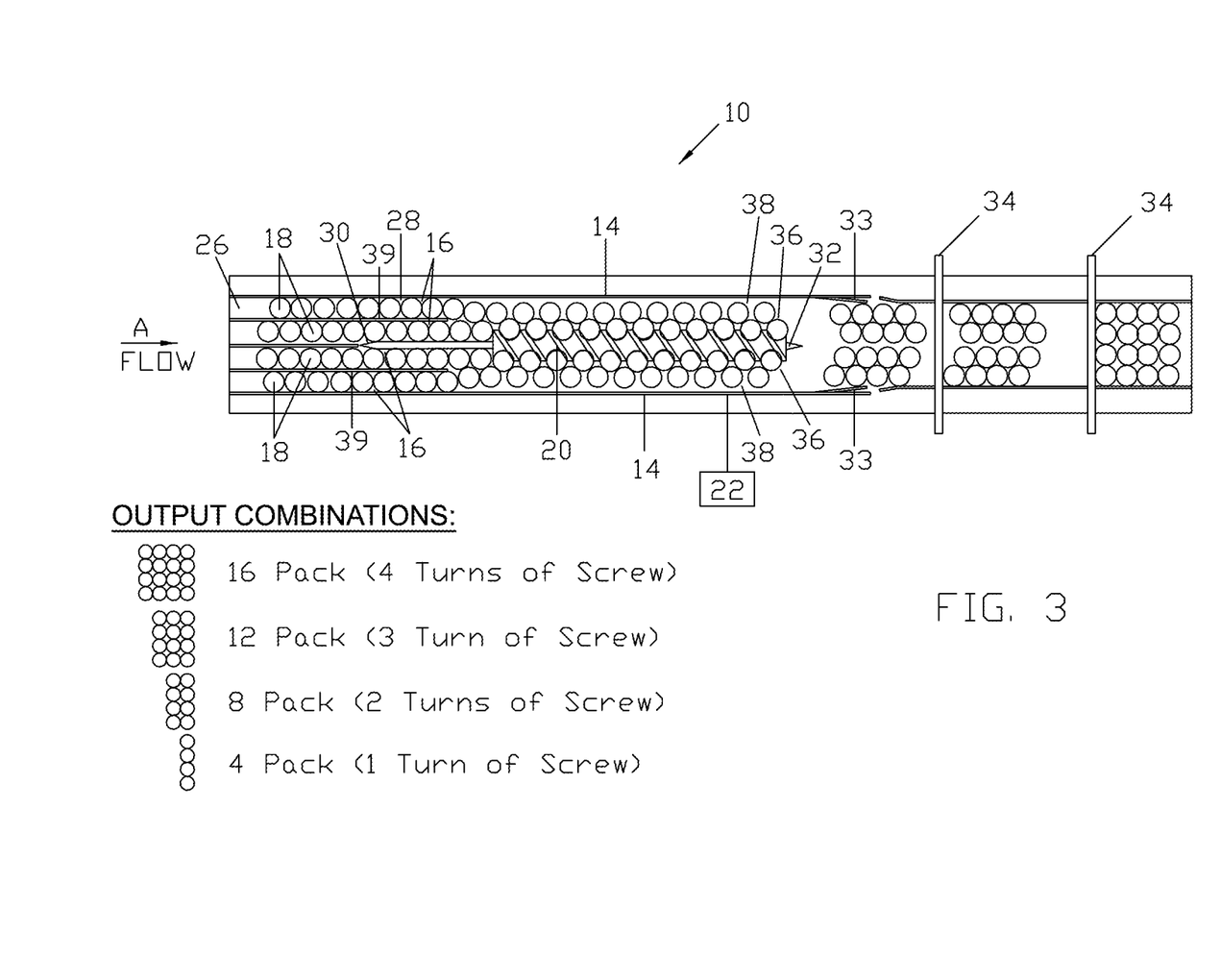
FIG. 3 shows a third example embodiment of a grouper in accordance with the present invention.

FIG. 3 shows an example embodiment similar to the FIG. 2 example embodiment. However, as shown in FIG. 3, the two container guides 14 are positioned such that two lanes 16 are provided on each side of the single timing screw 20: two inside lanes 36, each adjacent one side of the single timing screw 20 and two outside lanes 38, each adjacent a corresponding inside lane 36. Similarly to the embodiment shown in FIG. 2, the containers 18 received in each of the outside lanes 38 may be offset from, and in contact with, the containers 18 received in each of the corresponding inside lanes 36. The metering of the containers in the FIG. 3 embodiment is the same as described above in connection with the FIG. 2 embodiment, except that the single timing screw 20 of the FIG. 3 embodiment may be controlled by the controller 22 to output container groupings having multiples of four containers 18. For example, one turn of the timing screw 20 may release a 4-container group; two turns of the timing screw 20 may release an 8-container group; three turns of the timing screw 20 may release a 12-container group; and four turns of the timing screw 20 may release a 16-container group. In other example embodiments, more than one timing screw 20 may be used, such as shown in FIGS. 4, 5 and 6, for example.

Figure 4:
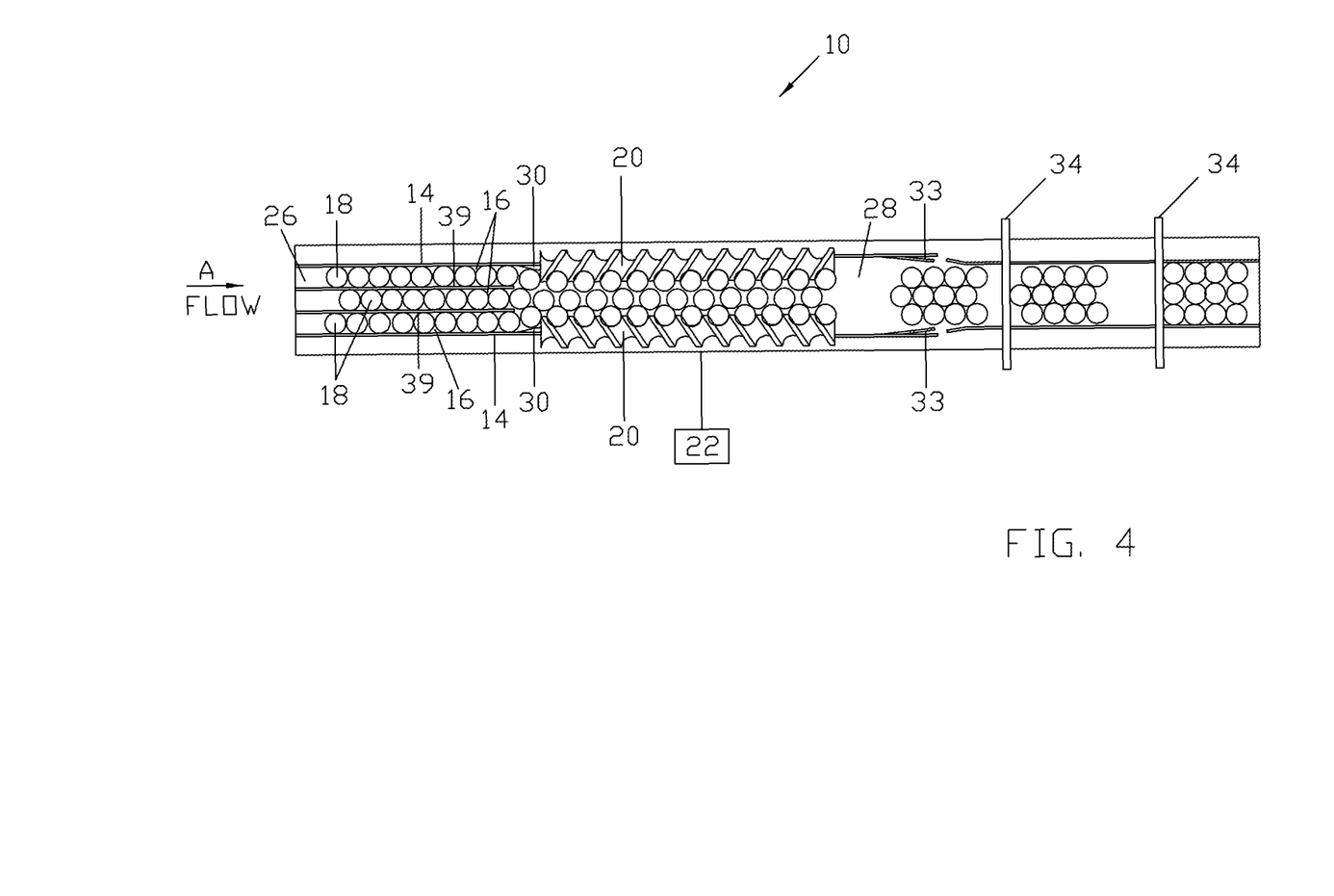
FIG. 4 shows a fourth example embodiment of a grouper in accordance with the present invention.

In the example embodiment shown in FIG. 4, the grouper 10 comprises two container guides 14, two timing screws 20, and two intake guides 39, such that three lanes 16 of containers 18 are provided: an inside lane adjacent each timing screw 20 and a center lane between the two inside lanes. Each timing screw 20 is positioned coaxial with (i.e., along or adjacent an end of) each of the container guides 14 (e.g., on the outsides of the grouper conveyor 28). The containers 18 in each of the inside lanes 16 adjacent the timing screws 20 may be approximately aligned with one another, while the containers 18 received in a center lane 16 may be offset from, and in contact with, the containers 18 received in both of the inside lanes 16. As the timing screws 20 rotate to move the containers 18 in the outer lanes 16, the containers 18 in the center lane 16 are allowed to move along the conveyor 28. When the timing screws 20 are stopped, the offset containers 18 in the center lane 16 are prevented from moving along the grouper conveyor 28 by the containers 18 in the inside lanes 16. In this manner, the timing screws 20 may be controlled by the controller 22 to output container groupings having multiples of three containers 18.

Figure 5:
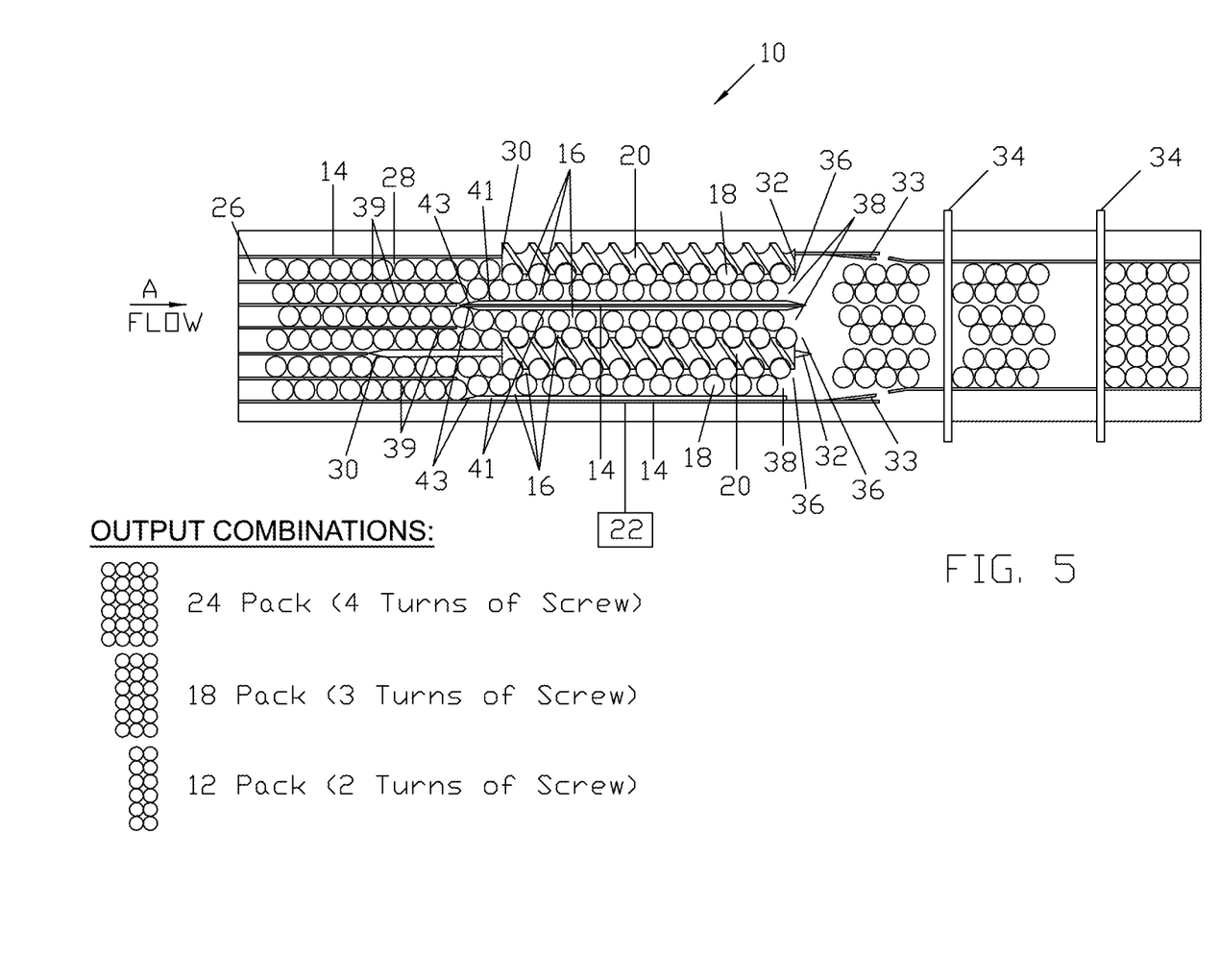
FIG. 5 shows a fifth example embodiment of a grouper in accordance with the present invention.
Figure 6:
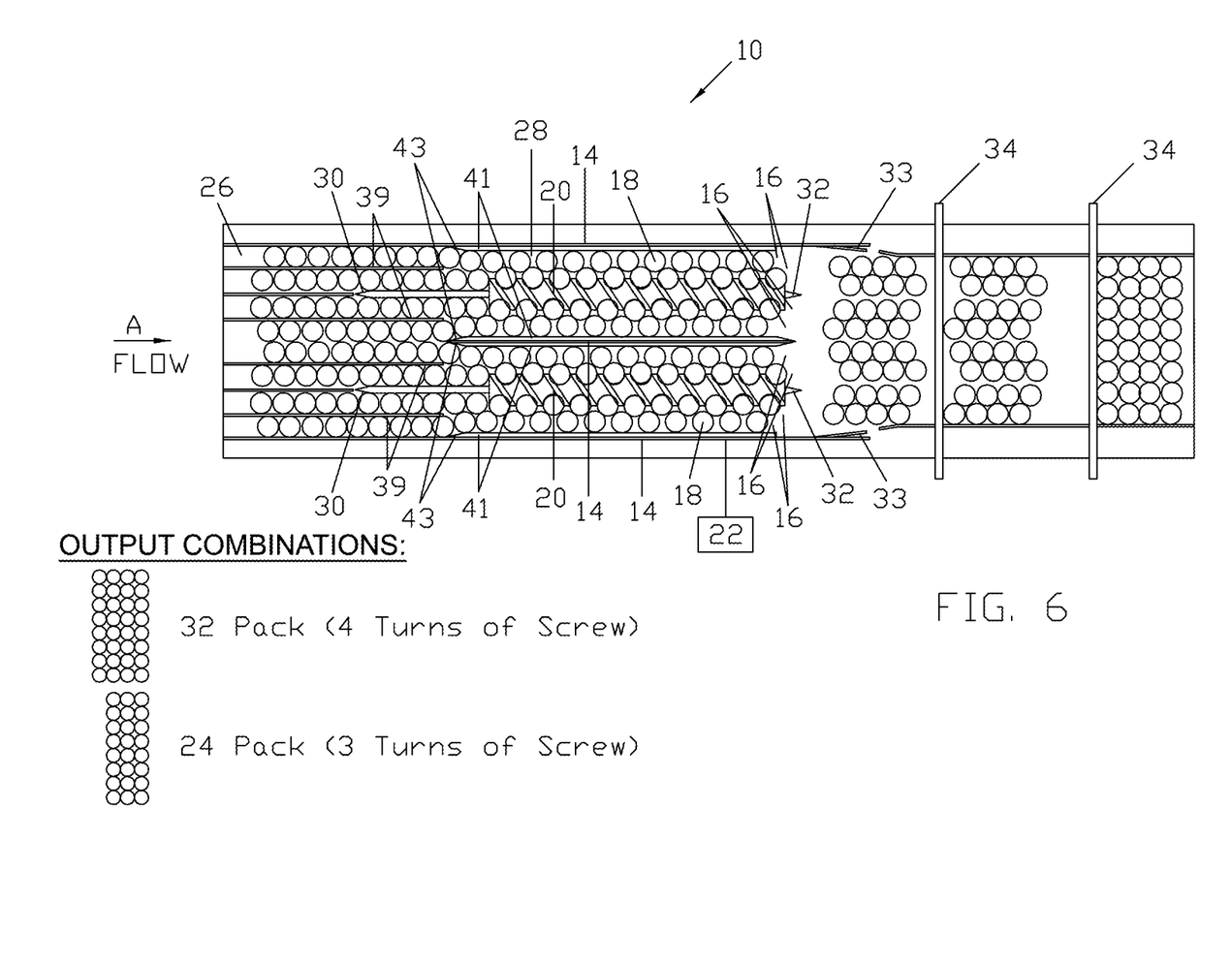
FIG. 6 shows a sixth example embodiment of a grouper in accordance with the present invention.

In the example embodiment shown in FIG. 5, the grouper 10 comprises three container guides 14, two timing screws 20 and at least three intake guides 39, such that six lanes of containers 18 are provided. One of the timing screws 20 (an outer timing screw) may be positioned coaxial with a first outer container guide 14. An inner container guide 14 may be positioned between the outer timing screw 20 and an inner timing screw 20. A second outer container guide 14 may be spaced from the inner timing screw 20 on the opposite side of the conveyor 28 from the first outer container guide 14. Two adjacent lanes 16 are defined between the outer timing screw 20 and the inner container guide 14, between the inner container guide 14 and the inner timing screw 20, and between the inner timing screw 20 and the second outer container guide 14. The containers 18 in each of the two adjacent lanes 16 are offset from one another as discussed above. Additional intake guides 39 may be provided that are co-axial with the inner timing screw 20 and/or the inner container guide 14.

In the FIG. 5 embodiment, rotation of the two timing screws 20 may be controlled to output container groupings having multiples of six containers 18. For example, two turns of the timing screws 20 may release a 12-container group; three turns of the timing screws 20 may release an 18-container group; four turns of the timing screws 20 may release a 24-container group, etc.

In the example embodiment shown in FIG. 6, the grouper 10 comprises three container guides 14 (a first outer container guide, a second outer container guide, and an inner container guide), two timing screws 20 (a first timing screw positioned between the first outer container guide and the inner container guide and a second timing screw positioned between the second outer container guide and the inner container guide), and four intake guides 39, such that eight lanes of containers 18 are provided, with two lanes of offset containers 18 between each container guide 14 and timing screw 20. In the FIG. 6 embodiment, the rotation of the two timing screws 20 may be controlled to output container groupings having multiples of eight. For example, three turns of the timing screws 20 may release a 24-container group; four turns of the timing screws 20 may release a 32-container group, etc. In the FIG. 6 embodiment, the two timing screws 20 may advantageously control eight lanes 16 of containers 18. The example embodiments shown in FIGS. 5 and 6 provide advantages over prior art groupers such as the side mounted or star wheel groupers, which can only run four lanes of containers.

Figure 7:
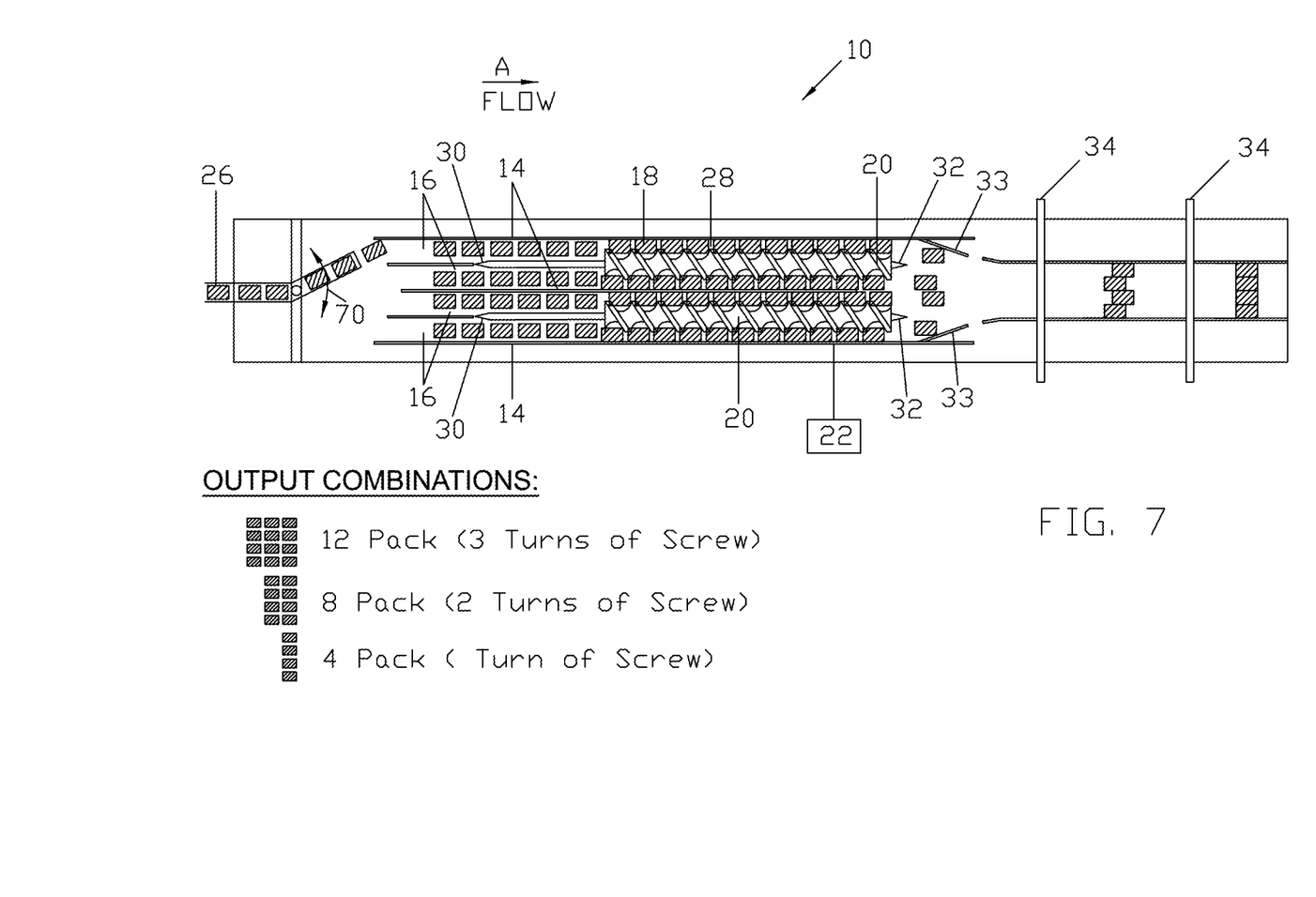
FIG. 7 shows an example embodiment of a grouper used with non-round containers in accordance with the present invention.

In other example embodiments, the grouper 10 may be configured to group non-round containers 18, as shown, for example, in FIG. 7. Most prior art grouper technologies, such as servo or mechanical side mounted groupers, side mounted "star wheels," overhead shifting pin groupers (also known as shuttle groupers), and bottom pin groupers, cannot be used to group non-round containers. The grouper 10 shown in FIG. 7 comprises three adjustable container guides 14 and two timing screws 20, such that four lanes 16 of containers 18 are provided, with one lane 16 of containers 18 between each adjustable container guide 14 and timing screw 20. The in-feed conveyor 26 may be movable in a sweeping motion so that it can sweep across an area adjacent the in-feed portion 30 of the at least one timing screw, as indicated by the arrow 70, to direct or feed the containers 18 into each of the lanes 16 in turn. As discussed above with round containers, the timing screws 20 of the FIG. 7 embodiment may rotate to move the non-round containers 18 in the lanes 16 adjacent thereto. The two timing screws 20 may be controlled and coordinated by the controller 22 to output container groupings having multiples of four.

Other various configurations of timing screws 20 and container guides 14 are also within the scope of the present invention, including variations apparent from the example embodiments of FIGS. 1-6. For example, embodiments may include multiple lanes of offset containers 18 for a single side of a timing screw (e.g., three offset lanes between a single timing screw 20 and a single container guide 14), combinations of the different arrangements of the example embodiments may be provided, or other configurations taking advantage of the offset container concept.

Further, while the example embodiment shown in FIG. 7 uses two timing screws 20 to control four lanes of containers 18, more or less timing screws 20 may be used to control more or less lanes of containers 18. Similarly to the example embodiments describing round containers 18, each timing screw 20 in the embodiments describing non-round containers 18 may receive non-round containers 18 on either side thereof. For example, one timing screw 20 may accommodate two lanes 16 of containers 18; two timing screws 20 may accommodate four lanes 16 of containers 18, three timing screws 20 may accommodate six lanes 16 of containers 18, etc. Receiving non-round containers 18 on both sides of the timing screw 20 may greatly increase packaging speeds by around 50% compared to receiving containers on only a single side of the timing screw. Further, the example embodiment shown in FIG. 7, as well as the possible variations thereof discussed above, allows for continuous motion packaging of non-round containers, as opposed to existing intermittent motion machinery used to package non-round containers.

While FIG. 7 shows the present invention implemented for rectangular containers, it should be appreciated that the present invention can be easily adapted for use with oval containers, square containers, tapered containers, asymmetric containers, or the like.

Different timing screws 20 may have dimensions (e.g. different sized pockets 24 or overall length of the timing screw) to accommodate different sized containers 18 and/or different quantity groupings. Accordingly, the present invention provides the ability to quickly and simply change over to different sized containers 18 compared to other grouper technologies by replacing the one timing screw with a different timing screw. The timing screws 20 may be releasably held in the grouper 10. For example, the timing screws 20 may be secured in the grouper 10 by a snap-fit connection for easy release and re-connection, or any other type of releasable connection.

Figure 8:
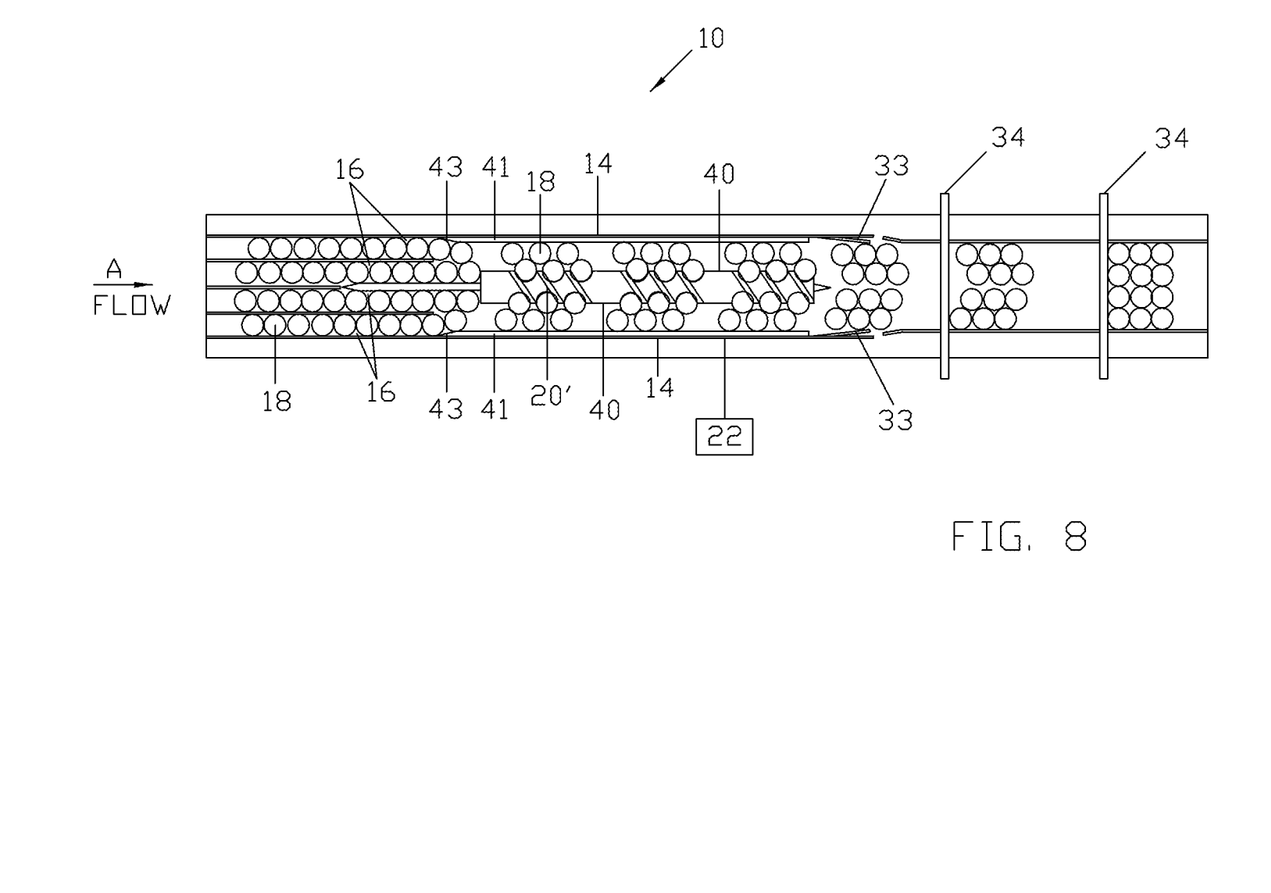
FIG. 8 shows a further example embodiment of a grouper with a gapped timing screw in accordance with the present invention.

FIG. 8 shows a further example embodiment of a timing screw 20' used on an example implementation of the present invention. The arrangement of the timing screw 20' and the container guides 14 is the same as that discussed above in connection with FIG. 3. However, the timing screw 20' differs from the prior art timing screw 20 shown in detail in FIG. 1A in that gaps 40 are provided at defined intervals of the screw threads 25. The defined intervals or spacings of the gaps 40 are adapted to provide a desired output grouping without the need to stop revolution of the timing screw 20'. FIG. 8 shows a single timing screw 20' positioned between two container guides 14 with two offset lanes 16 on either side of the timing screw 20'. The gaps are provided between every three pockets 24 of the timing screw 20 so that the output is separated into groupings of twelve containers (six on either side of the timing screw 20' in each set of pockets 24) during a continuous revolution of the timing screw 20'. Those skilled in the art will appreciate that the timing screw 20' can be advantageously implemented in any of the configurations discussed herein or shown in the FIGS. 1-7.

Further, from the foregoing example embodiments it should be appreciated that the present invention is easily adaptable to output varying container groupings. For example, the FIG. 1 embodiment, which outputs multiples of two containers, can easily and simply be adapted to output multiples of three or four containers as shown in the embodiments of FIGS. 2 and 3, respectively, simply by moving the container guide 14 defining a single lane 16 in FIG. 1 outward to define two lanes 16 as shown in FIGS. 2 and 3. The FIG. 6 embodiment, which outputs multiples of eight containers, can be easily modified to output six containers (either by moving the outer container guides 14 in so that only one outer lane is provided, or moving one of the outer container guides 14 adjacent one of the timing screws 20 (to obtain the FIG. 5 embodiment). Similar changes can be made to reconfigure the other embodiments discussed herein to accommodate more or fewer lanes of containers.

It should also be appreciated any one or each container guide(s) 14 and any one or each timing screw(s) 20 may be laterally movable for at least one of: defining lanes 16 of varying sizes for accommodating containers of various sizes or shapes; defining one or more lanes 16 between the at least two container guides 14 and the at least one timing screw 20; and adding or removing one or more lanes 16. For example, by moving at least one of the at least two container guides 14 or the at least one timing screw 20, one of: one lane 16 is formed on each side of the at least one timing screw 20 (as shown for example in FIG. 1); two lanes 16 are formed on at least one side of the at least one timing screw 20 (as shown for example in FIG. 2); and a lane is removed from at least one side of the at least one timing screw (for example, changing from the FIG. 2 configuration to the FIG. 1 configuration). The container guides and timing screws may be mounted such that they are movable laterally either manually (e.g., via a gear and crank assembly or the like) or via motors (not shown), which may be either A/C motors, servo motors, or any other suitable motors as would be appreciated by those skilled in the art.

Further, timing screws 20 may also be easily removed or added to the grouper apparatus 10 in order to easily enable different output groupings (e.g., to change from the FIG. 1 embodiment to the FIG. 6 embodiment, and vice versa, for example).

The turning motors and drive assemblies (not shown) for the timing screws 20 may also be mounted either over or under the grouper conveyor 28, facilitating faster change over, and flexibility when retro-fitting the present invention to existing packaging machines. Retro-fitting existing packing machinery with the apparatus of the present invention may be cost effective as it may enable grouping containers faster than other technologies, provide a wider range of grouping outputs, has a smaller footprint, can be easily adapted to provide additional lanes of output (as described in more detail above), and prevent the obsolescence of machinery with out-dated grouping technology.

It should now be appreciated that the present invention provides advantageous methods and apparatus for grouping containers. In particular, with the present invention, a single timing screw may advantageously be used to control up to four lanes of containers, an inner lane of containers adjacent each side of the timing screw and an outer lane of containers adjacent and offset from each of the inner lanes, thereby permitting output groupings of up to four containers per timing screw used. Likewise, up to eight lanes of containers may be controlled using only two timing screws.

Although the invention has been described in connection with various illustrated embodiments, numerous modifications and adaptations may be made thereto without departing from the spirit and scope of the invention as set forth in the claims.

What is claimed is:

1. A grouper apparatus for a packaging machine, comprising:
   at least two container guides for defining lanes for receiving containers, at least one of the at least two container guides being movable;
   at least one timing screw positioned at least one of: between the at least two container guides; and coaxial with a corresponding one of the at least two container guides, each of the at least one timing screw being adapted to receive and advance at least one lane of containers on each side thereof.

2. A grouper apparatus in accordance with claim 1, further comprising:
   a controller for controlling revolution of the at least one timing screw to provide at least one of a desired output grouping and a desired output rate of the containers.

3. A grouper apparatus in accordance with claim 1, wherein pockets for capturing and advancing one or more of the containers are formed between threads of the at least one timing screw.

4. A grouper apparatus in accordance with claim 1, further comprising:
   a conveyor for moving the containers through the grouper;
   wherein at least one of a desired output grouping and a desired output rate are provided by controlling the revolution of the at least one timing screw while maintaining conveyor movement.

5. A grouper apparatus in accordance with claim 4, wherein the conveyor comprises:
   an in-feed conveyor for feeding the containers into the lanes defined by the at least two container guides; and
   a grouper conveyor for moving the containers through the lanes;
   wherein the at least one of the desired output grouping and the desired output rate are provided by controlling the revolution of the at least one timing screw while maintaining movement of the grouper conveyor.

6. A grouper apparatus in accordance with claim 1, wherein the at least one of the at least two container guides and the at least one timing screw are each laterally movable for at least one of: defining lanes of varying sizes for accommodating containers of various sizes or shapes; defining one or more lanes between the at least two container guides and the at least one timing screw; and adding or removing one or more lanes.

7. A grouper apparatus in accordance with claim 6, wherein by moving the at least one of the at least two container guides or the at least one timing screw, one of:
   at least one lane is formed on each side of the at least one timing screw;
   at least two lanes are formed on at least one side of the at least one timing screw; and
   at least one lane is removed from at least one side of the at least one timing screw.

8. A grouper apparatus in accordance with claim 1, wherein:
   the at least one timing screw is provided with a gap at defined intervals of the screw threads; and
   the defined intervals are adapted to provide a desired output grouping.

9. A grouper apparatus in accordance with claim 1, wherein the at least one timing screw is adapted to accept one of round containers, square containers, rectangular containers, oval containers, tapered containers, and asymmetric containers.

10. A grouper apparatus in accordance with claim 1, wherein two lanes are formed between one of the at least two container guides and one of the at least one timing screw.

11. A grouper apparatus for a packaging machine, comprising:
    at least two container guides for defining lanes for receiving containers, at least one of the at least two container guides being movable;
    at least one timing screw positioned at least one of: between the at least two container guides; and coaxial with a corresponding one of the at least two container guides, the at least one timing screw being adapted to receive and advance at least one lane of containers on either side thereof;
    a conveyor for moving the containers through the grouper, the conveyor comprising:
       an in-feed conveyor for feeding the containers into the lanes defined by the at least two container guides; and
       a grouper conveyor for moving the containers through the lanes; and
    one or more intake guides for guiding the containers from the in-feed conveyor to an in-feed portion of the at least one timing screw;
    wherein at least one of a desired output grouping and a desired output rate are provided by controlling the revolution of the at least one timing screw while maintaining movement of the grouper conveyor.

12. A grouper apparatus for a packaging machine, comprising:
    at least two container guides for defining lanes for receiving containers, at least one of the at least two container guides being movable;
    at least one timing screw positioned at least one of: between the at least two container guides; and coaxial with a corresponding one of the at least two container guides, the at least one timing screw being adapted to receive and advance at least one lane of containers on either side thereof; and
    a conveyor for moving the containers through the grouper, the conveyor comprising:
       an in-feed conveyor for feeding the containers into the lanes defined by the at least two container guides; and
       a grouper conveyor for moving the containers through the lanes;
    wherein:
    at least one of a desired output grouping and a desired output rate are provided by controlling the revolution of the at least one timing screw while maintaining movement of the grouper conveyor; and
    the in-feed conveyor comprises a moveable conveyor which is adapted to sweep across an area adjacent an in-feed portion of the at least one timing screw to direct the containers into each of the lanes in turn.

13. A grouper apparatus for a packaging machine, comprising:
    two container guides for defining lanes for receiving containers, at least one of the two container guides being movable;
    a single timing screw positioned between the two container guides and adapted to receive and advance at least two lanes of containers; and the two container guides are positioned such that two of the at least two lanes are provided on at least one side of the single timing screw, an inside lane adjacent the single timing screw and an outside lane adjacent the inside lane;

the containers received in the outside lane are offset from the containers received in the inside lane; and the single timing screw is controlled to output container groupings having multiples of three containers or multiples of four containers.

14. A grouper apparatus for a packaging machine, comprising:

at least two container guides for defining lanes for receiving containers, at least one of the at least two container guides being movable;

at least one timing screw positioned at least one of: between the at least two container guides; and coaxial with a corresponding one of the at least two container guides, the at least one timing screw being adapted to receive and advance at least one lane of containers on either side thereof;

wherein:

the at least two container guides are positioned to provide two lanes on each side of the at least one timing screw, an inside lane adjacent each side of the at least one timing screw and a corresponding outside lane adjacent each of the inside lanes; and the containers received in each of the outside lanes are offset from the containers received in each of the corresponding inside lanes such that output of one of the containers in the inside lane from the timing screw also outputs a corresponding offset container in the outside lane.

15. A grouper apparatus for a packaging machine, comprising:

at least two container guides for defining lanes for receiving containers, at least one of the at least two container guides being movable;

two timing screws, each of the two timing screws being arranged coaxial with a corresponding one of the at least two container guides and being adapted to receive and advance at least three lanes of containers;

wherein the three lanes are formed between the two timing screws, an inside lane adjacent each of the two timing screws and a center lane between the two inside lanes, the containers in the center lane being offset from the containers in the two inside lanes.

16. The grouper apparatus for a packaging machine, comprising:

at least two container guides for defining lanes for receiving containers, at least one of the at least two container guides being movable;

two timing screws each adapted to receive and advance at least one lane of containers, a first timing screw arranged coaxial with a first outer one of the at least two container guides and a second timing screw arranged between a second outer one of the at least two container guides and an inner container guide, the inner container guide being arranged between the first and the second timing screw;

two lanes are formed between the first timing screw and the inner container guide, the containers in each of the two lanes being offset from one another;

two lanes are formed between the second timing screw and the inner container guide, the containers in each of the two lanes being offset from one another; and two lanes are formed between the second timing screw and the second outer container guide, the containers in each of the two lanes being offset from one another.

17. The grouper apparatus for a packaging machine, comprising:

three container guides for defining lanes for receiving containers, at least one of the three container guides being movable, the three container guides comprising a first outer container guide, an inner container guide, and a second outer container guide;

two timing screws adapted to receive and advance at least two lanes of containers, the two timing screws comprising: a first timing screw arranged between the first outer container guide and the inner container guide, with two lanes being formed on either side of the first timing screw; and a second timing screw arranged between the second outer container guide and the inner container guide, with two lanes being formed on either side of the second timing screw;

the containers in each of the two lanes formed on either side of each of the two timing screws being offset from one another.

18. A method of grouping containers for a packaging machine, comprising:

providing at least two container guides for defining lanes for receiving containers, at least one of the at least two container guides being movable;

providing at least one timing screw positioned at least one of: between the at least two container guides; and coaxial with a corresponding one of the at least two container guides, each of the at least one timing screw being adapted to receive and advance at least one lane of the containers on each side thereof.

19. A method in accordance with claim 18, further comprising:

controlling revolution of the at least one timing screw to provide at least one of a desired output grouping and a desired output rate of the containers.

20. A method in accordance with claim 18, wherein two lanes are formed between one of the at least two container guides and one of the at least one timing screw.

* * * * *